Jan. 8, 1952 — Z. SZULCE — 2,581,611
FLEXIBLE MATTRESS SUPPORT
Filed Dec. 20, 1947 — 2 SHEETS—SHEET 1
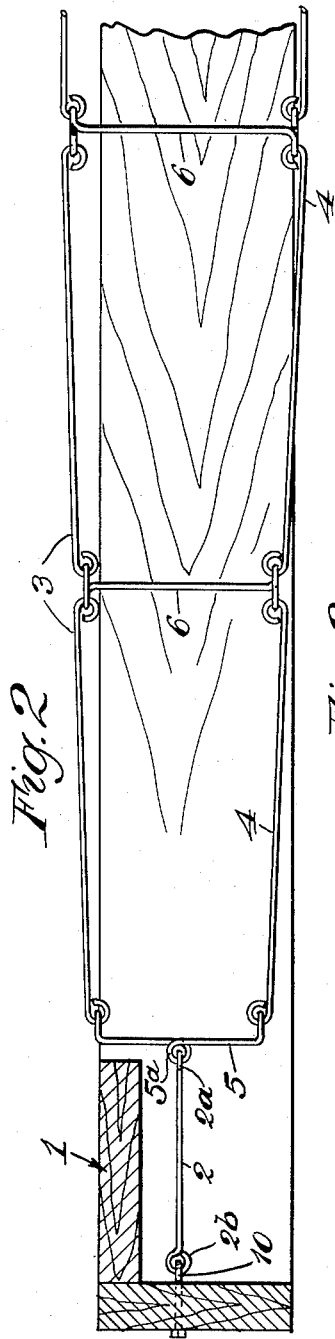
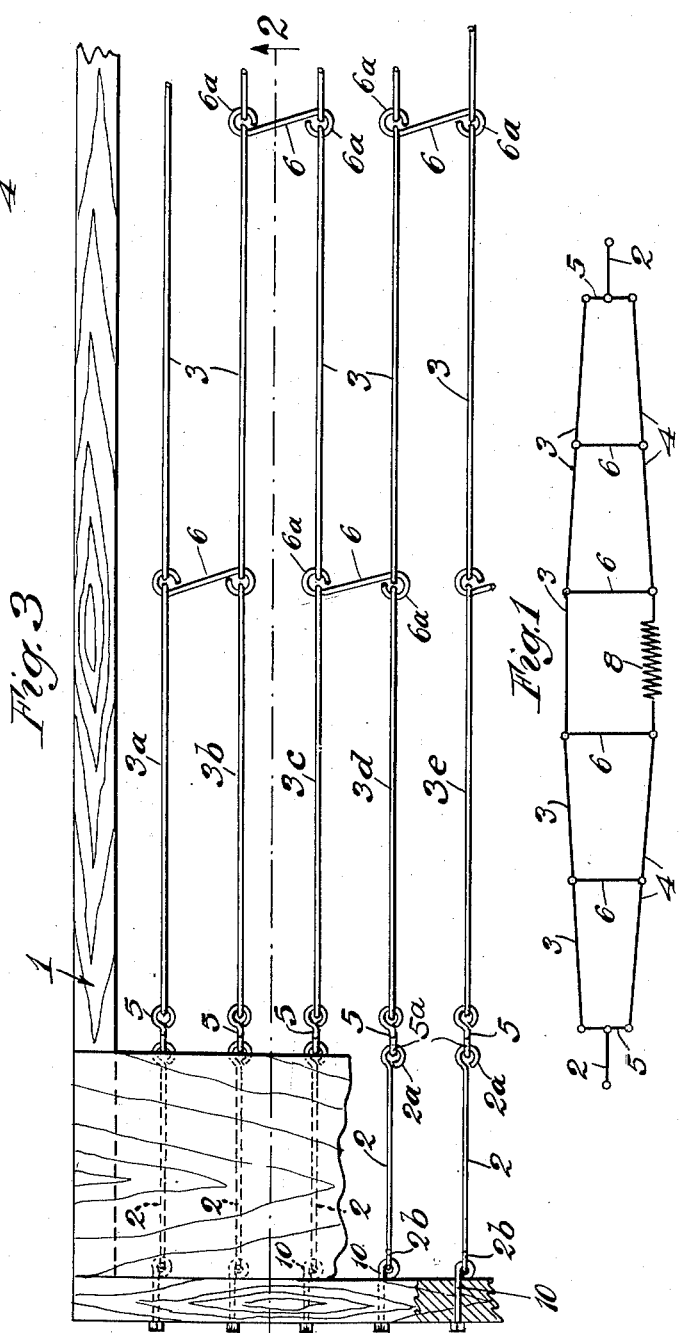
Inventor
Zygmunt Szulce
by Singer, Ehlert, Stern & Carlberg
Attorneys.

Jan. 8, 1952          Z. SZULCE          2,581,611
FLEXIBLE MATTRESS SUPPORT
Filed Dec. 20, 1947          2 SHEETS—SHEET 2
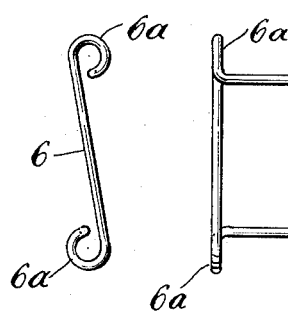
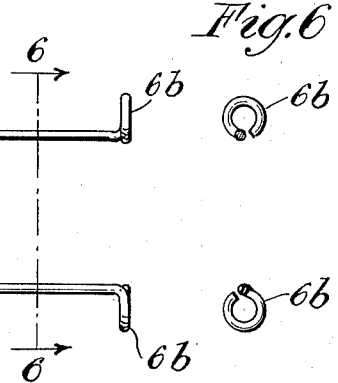
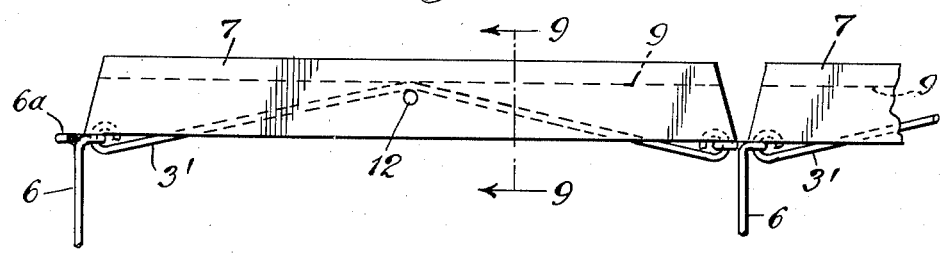
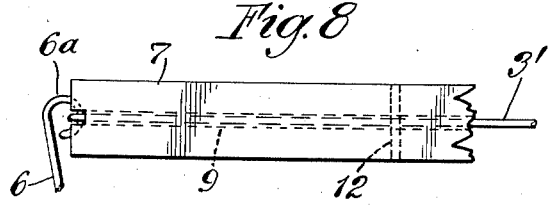
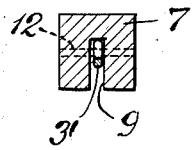
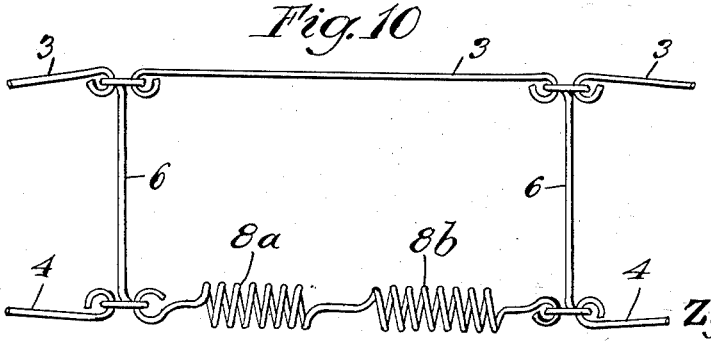
Inventor
Zygmunt Szulce
by Singer, Ehlert, Stern & Carlberg
Attorneys.

Patented Jan. 8, 1952

2,581,611

UNITED STATES PATENT OFFICE 2,581,611

FLEXIBLE MATTRESS SUPPORT

Zygmunt Szulce, Warsaw, Poland

Application December 20, 1947, Serial No. 792,963
In Poland December 6, 1940

Section 1, Public Law 690, August 8, 1946
Patent expires December 6, 1960

13 Claims. (Cl. 5—239)

The invention relates to mattresses and particularly is directed to a flexible mattress support composed of a plurality of latticed trusses disposed parallel to each other in spaced relation and extending lengthwise of the bedstead or mattress.

It is an object of the invention to provide a highly flexible and durable mattress support in which the upper and lower chords of the latticed trusses consist each of a series of rigid wire members which are flexibly connected with each other.

It is also an object of the invention to provide a lengthy flexible mattress support in which the upper and lower chords of the latticed trusses may be made of any suitable flexible material or member, such as leather straps, hemp straps, chains or wire.

Another object of the invention is to flexibly connect the wire members of the upper and lower chords of the latticed trusses with each other by vertical wire members the ends of which form articulated connections with the respective ends of the horizontal wire members of the upper and lower chords, and thereby flexibly connect two adjacent ends of the chord wire members with each other. Preferably, transversely disposed vertical double wire links or U-shaped wire links with loops at all four ends or corners are employed for flexibly connecting the chord members of each two trusses with each other and maintaining the same in properly parallel spaced relation.

It is also an object of the invention to connect the latticed trusses solely with their ends flexibly to the opposed ends of a frame forming a portion of the mattress support or of the bedstead.

Another important object of the invention is to arrange a helical spring or a number of helical springs in the lower chord of each one of the latticed trusses, preferably in the center thereof. If, for instance, two helical springs are employed, one spring is preferably wound in the right hand direction and the other in the left hand direction, whereby the movements of these springs, upon use of the mattress support, compensate each other and any noise is prevented.

Still another object of the invention is to provide the upper chords of the latticed trusses with wooden slats upon which the mattress is adapted to rest. These slats are provided at their bottom faces with lengthwise extending grooves into which extend the suitably bent wire members of the upper chord to be locked therein by a cross pin or the like.

Other objects of the invention will be apparent or will be specifically pointed out in the description forming a part of this specification, but it is to be understood that the invention is not limited to the embodiments herein described, as various forms may be adopted within the scope of the appended claims.

Referring to the drawing which illustrates by way of example two embodiments of the invention:

Fig. 1 illustrates diagrammatically a side elevation view of a latticed truss of the mattress support, Fig. 2 is a sectional view of one end of the mattress support on the line 2—2 of Fig. 3, Fig. 3 is a top plan view of a portion of the mattress support, Fig. 4 is a side elevation view of a double wire link used in the mattress support, Fig. 5 is an end view of the double wire link viewed from the left hand side of Fig. 4, Fig. 6 is a cross-sectional view of the double wire link on the line 6—6 of Fig. 4, Fig. 7 illustrates in a side elevation view a portion of a truss with wooden slats thereon, Fig. 8 illustrates the parts shown in Fig. 7 in a top plan view, Fig. 9 is a cross-sectional view on the line 9—9 of Fig. 7, and Fig. 10 illustrates the center portion of a latticed truss provided in its lower chord with two helical springs of opposed winding direction.

Referring to the drawing, 1 indicates the substantially rectangular frame of the mattress support in which are mounted a plurality of latticed trusses, the one illustrated being designated in Fig. 3 with $3^a$, $3^b$, $3^c$, $3^d$ and $3^e$, each having an upper and a lower chord. Each truss comprises a series of longitudinal members 3 forming the upper chord, a series of longitudinal members 4 forming the lower chord, two end verticals 5 and a series of verticals 6 connecting the two chords with each other. Preferably, the verticals 6 consist of a double wire link formed by a U-shaped rigid wire having two parallel legs, with loops $6^a$ and $6^b$ formed at both ends of each leg. The loops $6^a$ and $6^b$ are arranged in planes at right angles to the axes of the legs as clearly shown in Fig. 4. Each loop $6^a$ and $6^b$ is flexibly connected to two adjacent ends of longitudinal members 3 or 4 respectively. The U-shaped links 6 are arranged transversely to the longitudinal direction of the frame 1, so that each link 6 connects two adjacent trusses with each other, whereby the wire piece forming the base of the U between the two legs forms a spacer member which holds the two adjacent trusses apart in properly spaced relation. It will be noted from Fig. 3 that the U-shaped links 6 are arranged in staggered relation lengthwise of the mattress support and are so used to alternately connect trusses 3a and 3b, then trusses 3b and 3c, and then again trusses 3a and 3b. The other trusses are similarly connected and thereby all of the trusses arranged in the frame 1 are maintained in properly spaced parallel relation.

At the ends of each truss the upper and lower chords are connected with each other by a single rigid vertical connector wire 5, which latter between its ends, preferably in the center thereof, is provided with a loop 5a to which is flexibly connected a hook 2a on a horizontal hanger wire 2. The other end has a hook 2b which is attached flexibly to the loop of a bolt 10 attached to the end member of the frame 1 in any desired fashion. In this manner all the trusses are flexibly connected with their ends to the end members of the frame and the side members of the frame are entirely disconnected from the trusses.

A helical spring 8 (Fig. 1), or two helical springs 8a and 8b (Fig. 10) are arranged preferably in the center section of the lower chords in each latticed truss. The spring 8a is wound in the opposite direction as spring 8b is wound to compensate the movements of these springs and to prevent noise. The flexible connections of the individual elements of the trusses with each other and the springs 8 or 8a and 8b in the center of the lower chords make the entire structure very resilient. The action of the springs 8 or 8a, 8b is transferred by the adjacent verticals 6 to the elements 3 of the upper chords.

The upper and lower chords represented by the longitudinal members 3 and 4 may consist of any suitable flexible material, such as leather straps, hemp straps, chains or the like, or the members 3 and 4 may consist also each of a rigid wire piece with loops or hooks at their ends. When the members 3 and 4 consist of rigid wire pieces, it may be advisable to attach to the upper chord of the trusses suitable slats of wood or the like, for protecting the mattress which is to be supported by the structure of the invention.

As shown in the Figs. 7, 8 and 9, each slat 7 is provided in its bottom face with a longitudinal groove 9 for receiving the central portion of a rigid wire piece 3' bent between its ends to form an obtuse angle and locked in said groove by a transverse pin 12 or the like. The ends of each slat 7 are formed in such a manner that they are supported by the loops of the U-shaped links 6.

What I claim as my invention is:

1. A mattress support which comprises a rigid frame having two opposed end members, a plurality of latticed trusses arranged in parallel and spaced relation to each other in said frame, means for flexibly connecting each one of said latticed trusses with its ends to said opposed end members, each latticed truss having an upper chord and a lower chord each consisting of a series of rigid wire members and a series of vertical U-shaped links having their ends flexibly connected with adjacent ends of the wire members of said upper and lower chord respectively and connecting two adjacent trusses with each other.

2. A mattress support which comprises a rigid frame having two opposed end members, a plurality of latticed trusses arranged in parallel and spaced relation to each other in said frame, means for flexibly connecting each one of said latticed trusses with its ends to said opposed end members, each latticed truss having an upper chord and a lower chord each consisting of a series of rigid wire members, helical spring means arranged in said series of rigid wire members forming the lower chord of said latticed trusses and a series of vertical U-shaped links having their ends flexibly connected with adjacent ends of the wire members of said upper and lower chord respectively and connecting two adjacent trusses with each other.

3. A mattress support which comprises a rigid frame having two opposed end members, a plurality of latticed trusses arranged in parallel and spaced relation to each other in said frame, means for flexibly connecting each one of said latticed trusses with its ends to said opposed end members, each latticed truss having an upper chord and a lower chord each consisting of a series of rigid wire members, at least one helical spring arranged in said series of rigid wire members forming the lower chord of said latticed trusses and a series of vertical U-shaped links having their ends flexibly connected with adjacent ends of the wire members of said upper and lower chord respectively.

4. A mattress support which comprises a rigid frame having two opposed end members, a plurality of latticed trusses arranged in parallel and spaced relation to each other in said frame, means for flexibly connecting each one of said latticed trusses with its ends to said opposed end members, each latticed truss having an upper chord and a lower chord each consisting of a series of rigid wire members, two helical springs operatively connected together and arranged in the center section of said series of rigid wire members forming the lower chord of said latticed trusses, one of said springs being wound in the left hand direction and the other spring being wound in the right hand direction and a series of vertical U-shaped links having their ends flexibly connected with adjacent ends of the wire members of said upper and lower chord respectively.

5. A mattress support which comprises a rigid frame having two opposed end members, a plurality of latticed trusses arranged in parallel and spaced relation to each other in said frame, means for flexibly connecting each one of said latticed trusses with its ends to said opposed end members, each latticed truss having an upper chord and a lower chord each consisting of a series of rigid wire members, and a series of vertical and rigid U-shaped wire links arranged transversely to said rigid wire members, loops at each end of the two spaced and parallel legs of said U-shaped wire links, the loops of one leg connecting the adjacent ends of the wire members in the upper and lower chord of one truss flexibly with each other, while the loops on the other leg connect the adjacent ends of the wire members in the upper and lower chord of the next adjacent truss flexibly with each other, whereby the rigid wire portion between the vertical legs of the U-shaped wire links maintain the two adjacent trusses in spaced relation to each other.

6. A mattress support which comprises a rigid frame having two opposed end members, a plurality of latticed trusses arranged in parallel and spaced relation to each other in said frame, means for flexibly connecting each one of said latticed trusses with its ends to said opposed end members, each latticed truss having an upper chord and a lower chord each consisting of a series of rigid wire members, at least one helical spring arranged in the center of said series of rigid wire members forming the lower chord of said latticed truss, and a series of vertical and rigid U-shaped wire links arranged transversely to said rigid wire members, loops at each end of the two spaced and parallel legs of said U-shaped wire links, the loops of one leg connecting the adjacent ends of the wire members in the upper and lower chord of one truss flexibly with each other, while the loops on the other leg connect the adjacent ends of the wire members in the upper and lower chord of the next adjacent truss flexibly with each other, whereby the rigid wire portion between the vertical legs of the U-shaped wire links maintain the two adjacent trusses in spaced relation to each other.

7. A mattress support according to claim 1, in which said means for flexibly connecting each end of said latticed trusses with its corresponding end member of the frame comprise a single rigid wire member having a hook at both ends, and a loop forming member anchored to said end member, one for each end of the trusses, said single rigid wire being flexibly connected with one of its hooks to the loop of the corresponding loop forming member, while the other hook of said single rigid wire is connected flexibly to the vertical end link of said truss, namely to a loop formed intermediate the ends of said link.

8. A mattress support which comprises a rigid frame having two opposed end members, a plurality of latticed trusses arranged in parallel and spaced relation to each other in said frame, means for flexibly connecting each one of said latticed trusses with its ends to said opposed end members, each latticed truss having an upper chord and a lower chord each consisting of a series of rigid wire members, and a series of vertical links having their ends flexibly connected with adjacent ends of the wire members of said upper and lower chord respectively, and a series of slats attached to the upper chords of said latticed trusses, said slats having longitudinal grooves in their bottom faces for accommodating the series of rigid wire members forming the upper chords of the trusses, and means for locking said last named rigid wire members in the grooves of said wooden slats.

9. A mattress support which comprises a rigid frame having two opposed end members, a plurality of latticed trusses arranged in parallel and spaced relation to each other in said frame, means for flexibly connecting each one of said latticed trusses with its ends to said opposed end members, each latticed truss having an upper and a lower chord each consisting of a series of rigid wire members, at least one helical spring arranged in said series of rigid wire members forming the lower chord of said latticed trusses and a series of vertical and U-shaped links having their ends flexibly connected with adjacent ends of the wire members of said upper and lower chord respectively and the U-shaped links connecting two adjacent trusses with each other, and a series of wooden slats attached to the upper chords of said latticed trusses.

10. A mattress support which comprises a rigid frame having two opposed end members, a plurality of latticed trusses arranged in parallel and spaced relation to each other in said frame, means for flexibly connecting each one of said latticed trusses with its ends to said opposed end members, each latticed truss having an upper chord and a lower chord each consisting of a series of rigid wire members, two helical springs operatively connected together and arranged in the center section of said series of rigid wire members forming the lower chord of said latticed trusses, one of said springs being wound in the left hand direction and the other spring being wound in the right hand direction and a series of vertical links having their ends flexibly connected with adjacent ends of the wire members of said upper and lower chord respectively, and a series of wooden slats attached to the upper chords of said latticed trusses.

11. A mattress support which comprises a rigid frame having two opposed end members, a plurality of latticed trusses arranged in parallel and spaced relation to each other in said frame, means for flexibly connecting each one of said latticed trusses with its ends to said opposed end members, each latticed truss having an upper chord and a lower chord each consisting of a series of rigid wire members, two helical springs operatively connected together and arranged in the center section of said series of rigid wire members forming the lower chord of said latticed trusses, one of said springs being wound in the left hand direction and the other spring being wound in the right hand direction and a series of vertical and U-shaped links having their ends flexibly connected with adjacent ends of the wire members of said upper and lower chord respectively and the U-shaped links connecting two adjacent trusses with each other, and a series of wooden slats attached to the upper chord of said latticed trusses, said wooden slats having longitudinal grooves in their bottom faces for accommodating the series of rigid wire members forming the upper chord of the trusses, and means for locking said last named rigid wire members in the grooves of said wooden slats.

12. A mattress support which comprises a rigid frame having two opposed end members, a plurality of latticed trusses arranged in parallel and spaced relation to each other in said frame, means for flexibly connecting each one of said latticed trusses with its ends to said opposed end members, each latticed truss having an upper chord and a lower chord consisting of longitudinal flexible members, and a series of rigid vertical and U-shaped links arranged between said upper and lower chords and connected to the same so as to maintain said chords in properly spaced relation.

13. A mattress support which comprises a rigid frame having two opposed end members, a plurality of latticed trusses arranged in parallel and spaced relation to each other in said frame, means for flexibly connecting each one of said latticed trusses with its ends to said opposed end members, each latticed truss having an upper chord and a lower chord consisting of longitudinal flexible members, at least one helical spring arranged in said lower chord and forming a part of the same, and a series of rigid vertical and U-shaped links arranged between said upper and lower chords and connected to the same so as to maintain said chords in properly spaced relation.

ZYGMUNT SZULCE.

(References on following page)

REFERENCES CITED

The following references are of record in the file of this patent:

UNITED STATES PATENTS

| Number | Name | Date |
|---|---|---|
| 68,551 | Boynton | Sept. 3, 1867 |
| 77,339 | Walker | Apr. 28, 1868 |
| 194,811 | Essig | Sept. 4, 1877 |
| 218,686 | Radley | Aug. 19, 1879 |
| 354,672 | Bartling | Dec. 21, 1886 |
| 1,305,986 | Andres | June 10, 1919 |
| 1,528,125 | Morse | Mar. 3, 1925 |

FOREIGN PATENTS

| Number | Country | Date |
|---|---|---|
| 8,786 | Sweden | Mar. 5, 1898 |
| 432,597 | Great Britain | July 30, 1935 |
| 465,360 | Germany | Sept. 15, 1928 |